Nov. 27, 1945.   H. T. SPARROW   2,389,939
MOTOR CONTROL SYSTEM
Filed June 29, 1942
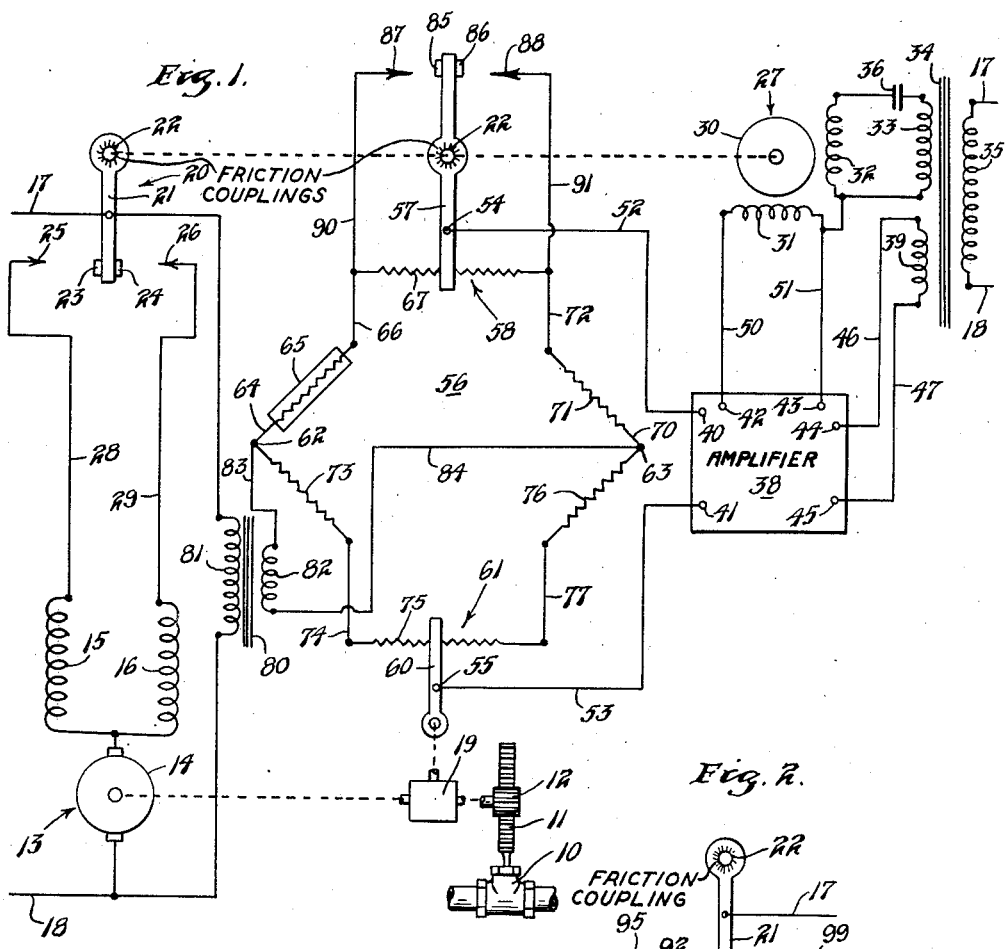
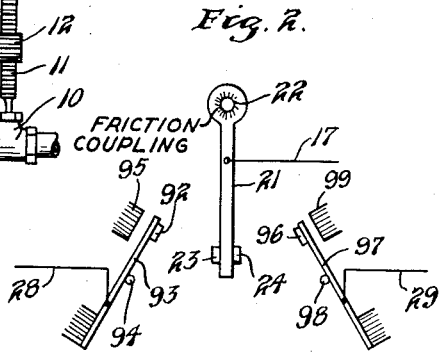
INVENTOR.
HUBERT T. SPARROW
BY
George H. Fisher
ATTORNEY Patented Nov. 27, 1945

2,389,939

UNITED STATES PATENT OFFICE 2,389,939

MOTOR CONTROL SYSTEM

Hubert T. Sparrow, Minneapolis, Minn., assignor to Minneapolis-Honeywell Regulator Company, Minneapolis, Minn., a corporation of Delaware Application June 29, 1942, Serial No. 448,971

13 Claims. (Cl. 172—239)

This invention relates to apparatus for controlling a reversible motor in accordance with the variations of a variable condition, and is particularly adapted for use in systems where it is desired to control large amounts of power by low-powered condition responsive means.

An object of the present invention is to provide a motor control system in which a high-powered motor is operated by a low-powered control device.

It is a further object of the present invention to provide an improved control system for a high-powered electrical motor including a control switch and motor means for driving said switch in such a manner that its contacts are rapidly closed and opened.

Another object of this invention is to provide, in a control system which is normally balanced, means responsive to the unbalance of the system for operating a primary control device away from a normal position, means responsive to movement of the first control device away from its normal position for operating a secondary control device and means responsive to operation of the secondary control device for restoring the primary control device to its normal position.

Other objects and advantages of the present invention will appear from a consideration of the accompanying specification, claims and drawing, in which Figure 1 represents, somewhat diagrammatically, an electrical motor control system embodying my invention, and Figure 2 represents a modified form of switch contact structure which may be used in the system of Figure 1.

I have illustrated my invention herein as applied to a control system for a valve 10, which is to be operated in accordance with the temperature adjacent a thermally sensitive resistance element 65. It should be understood that this particular system is shown by way of illustration only, and that the various features of my invention are readily applicable to other systems of control.

Referring now to Figure 1, the valve 10 is operated by a rack 11 and pinion 12, driven by a motor generally indicated at 13 through a gear train 19. The motor 13 is of the series type, and is provided with an armature 14 and a pair of opposed field windings 15 and 16. The field windings 15 and 16 are opposed in the sense that energization of winding 15 causes rotation of armature 14 in a direction opposite to the rotation caused by energization of field winding 16. The motor 13 may be supplied with electrical energy from alternating current supply lines 17 and 18.

The selective energization of the field windings 15 and 16 of motor 13 is controlled by a single-pole double-throw switch indicated generally at 20, and comprising a switch arm 21 attached to a shaft 22 by means of a slip friction connection. The switch arm 21 carries at its lower end a pair of contacts 23 and 24, which are respectively engageable with stationary contacts 25 and 26 upon rotation of switch arm 21 by means of shaft 22.

Shaft 22 is driven by a motor 27 having an armature 30 and a pair of field windings 31 and 32. The motor 27 is of the split phase type, the windings 31 and 32 being spaced from each other 90 electrical degrees. Winding 32 is supplied with alternating electrical energy from secondary winding 33 of a transformer 34 having a primary winding 35 connected to the supply lines 17 and 18. A condenser 36 is connected in series between secondary winding 33 and motor winding 32 in order to correct the phase of the alternating current flowing in winding 32.

Transformer 34 has another secondary winding 39 which supplies electrical energy to an amplifier schematically indicated at 38. While the amplifier 38 may be of any suitable type which will supply to motor winding 31 a current of a phase and magnitude dependent upon the phase and magnitude of the input voltage, I prefer to use one of the type shown and described in the co-pending application of Albert P. Upton, Serial No. 437,561, filed April 3, 1942.

Amplifier 38 has a pair of input terminals 40 and 41, a pair of output terminals 42 and 43, and a pair of power supply terminals 44 and 45. The power supply terminals 44 and 45 are connected through conductors 46 and 47, respectively, to the terminals of secondary winding 39. The output terminals 42 and 43 are connected through conductors 50 and 51, respectively, to the opposite terminals of motor winding 31.

The amplifier input terminals 40 and 41 are connected by conductors 52 and 53, respectively, to the opposite terminals 54 and 55 of a balanced electrical network of the Wheatstone bridge type, indicated generally at 56. The output terminal 54 is a point on the slider arm 57 of a primary rebalancing potentiometer 58, and the output terminal 55 is a point on the slider arm 60 of a secondary rebalancing potentiometer 61.

The balanced network 56 includes the usual pair of input terminals 62 and 63, the output terminals 54 and 55, and the conventional four branches of a Wheatstone bridge circuit connecting each of the input terminals with each of the output terminals.

The upper left branch of bridge circuit 56 connects input terminal 62 with output terminal 54, and may be traced from input terminal 62 through a conductor 64, temperature responsive resistance element 65, a conductor 66, a portion of slidewire resistance 67 which forms a part of the first rebalancing potentiometer 58, to slider 57 and output terminal 54. The temperature responsive resistance 65 is exposed to a temperature which controls the position of valve 10. It is to be understood that this showing is merely by way of example, and that any other variable impedance device could be used to control the balance of bridge circuit 56 in place of the temperature responsive resistance element 65.

The upper right branch of bridge circuit 56 connects input terminal 63 with output terminal 54, and may be traced from input terminal 63 through a conductor 70, a fixed resistance 71, a conductor 72, and a portion of the slidewire resistance 67 to slider 57 and output terminal 54.

The lower left branch of bridge circuit 56 connects input terminal 62 with output terminal 55, and may be traced from input terminal 62 through a fixed resistance 73, a conductor 74, a portion of a slidewire resistance 75 which forms a part of the secondary rebalancing potentiometer 61 to slider 60 and output terminal 55.

The lower right branch of bridge circuit 56 connects input terminal 63 with output terminal 55 and may be traced from input terminal 63 through a fixed resistance 76, a conductor 77, and a portion of slidewire resistance 75 to slider 60 and output terminal 55.

Power is supplied to bridge circuit 56 through a transformer 80 having a primary 81 connected to supply lines 17 and 18 and a secondary winding 82 connected by conductors 83 and 84, respectively, to bridge circuit input terminals 62 and 63.

Slider 60 of the secondary rebalancing potentiometer 61 is driven by motor 13 through gear train 19. Slider 57 of rebalancing potentiometer 58 is driven by motor 27 through shaft 22, to which slider arm 57 is attached by a slip friction connection similar to that which attaches the contact arm 21 to shaft 22. The slider arm 57 also carries a pair of contacts 85 and 86, which are selectively engageable with stationary contacts 87 and 88, respectively. Contact 87 is connected through a conductor 90 with the left terminal of slidewire resistance 67, and contact 88 is connected through a conductor 91 to the right terminal of slidewire resistance 67.

In Figure 2 is shown a modified form of switch contact mechanism which may be used to replace the stationary contacts 25 and 26 of Figure 1.

In place of the stationary contact 25 of Figure 1, Figure 2 shows a contact 92 carried at the end of a flexible contact arm 93, which is self-biased into engagement with a stop 94. Another stop 95 is spaced from the flexible contact arm 93 at a point opposite the contact 92. In a similar manner, the contact 26 of Figure 1 is replaced by a contact 96 carried at the end of a flexible contact arm 97 which is self-biased to engage a stop 98. A stop 99 is spaced from the flexible contact arm 97 at a point opposite the contact 96.

*Operation*

When the parts are in the positions shown in the drawing, the bridge circuit 56 is balanced, and the temperature adjacent the sensitive resistance element 65 is at the desired value. The valve 10 is half opened, and the supply of heating fluid passing through it is just sufficient to maintain the temperature adjacent the resistance element 65 at the desired value.

Under these conditions, let it be assumed that the temperature adjacent resistance element 65 begins to increase. This increases the resistance of element 65, thereby increasing the resistance in the upper left branch of the bridge circuit 56, and creating a potential difference between output terminals 54 and 55. This potential difference is such that the phase of output terminal 55 with respect to that of output terminal 54 is the same as that of input terminal 63 with respect to output terminal 62. The amplifier 38, as described in detail in the co-pending Upton application previously referred to, has a characteristic such that it supplies to motor winding 31 a current of a phase dependent upon the phase of the input potential applied to input terminals 40 and 41. Under the conditions described, the current supplied to winding 31 is such as to cause rotation of motor 27 in a direction to rotate shaft 22 in a clockwise direction, thereby moving slider 57 to the left along slidewire resistance 67, reducing the resistance in the upper left branch of the bridge circuit and tending to restore the bridge circuit 56 to a balanced condition. As soon as the bridge circuit 56 is again balanced, the signal applied to the amplifier input terminals 40 and 41 ceases, and the motor 27 stops.

If the temperature adjacent resistance element 65 continues to increase, the motor 27 continues to rotate the shaft 22 clockwise, and moves the slider 57 farther to the left along slidewire resistance 67. As this motion of slider 57 takes place, contact 86 is moved closer to contact 88. When contact 86 engages contact 88, that portion of slidewire resistance 67 to the right of slider 57 is shunted through the slider, contacts 86 and 88, and conductor 91. The shunting of this portion of resistance 67 unbalances bridge 56 further in the same direction as the unbalance caused by the increase of resistance 65. Therefore, motor 27 continues to rotate shaft 22 in a clockwise direction, and at a rapid rate of speed because of the large unbalance of the bridge circuit and consequent large current output of the amplifier 38. Slider 57 slips on the shaft 22 after contacts 86 and 88 engage. As a result of this rapid rotation of shaft 22 in a clockwise direction, contact 23 is moved rapidly into engagement with stationary contact 25, completing an energizing circuit for motor 13. This circuit may be traced from supply line 17 through contact arm 21, contacts 23 and 25, a conductor 28, field winding 15, and armature 14, to supply line 18.

This energization of motor 13 causes it to drive pinion 12 in a direction to close valve 10, and at the same time to move slider 60 to the right along resistance 75 so as to rebalance the bridge circuit 56. The resistance per unit length of slidewire resistance 75 is much greater than that of slidewire resistance 67, and therefore a small movement of slider 60 along resistance 55 has a greater effect on the balance of the bridge circuit than the movement of slider 57 relative to resistance 67. A relatively small movement of slider 60 is sufficient to rebalance bridge circuit 56.

As long as the bridge circuit 56 continues to be unbalanced in the direction determined by the shunting of resistance 67 by contacts 86 and 88, motor 27 continues to rotate shaft 22 clockwise, thereby maintaining contacts 23 and 25 in firm engagement. The motor 13 therefore continues to drive the slider 60 to the right along resistance 75. This motion continues until bridge circuit 56 is rebalanced and unbalanced slightly in the opposite direction by the movement of slider 60. When this opposite unbalance takes place, the direction of rotation of motor 27 is reversed. Therefore, shaft 22 is driven counter-clockwise and contacts 23 and 25 and 86 and 88 are separated. Separation of contacts 23 and 25 causes deenergization of motor 13 and stops movement of slider 60 and valve 10.

Separation of contacts 86 and 88 inserts the right hand end of slidewire resistance 67 again into the bridge circuit, thereby producing an additional unbalance effect in a sense causing counter-clockwise rotation of shaft 22. Slider arm 57 is then driven counter-clockwise rapidly until the motion of slider 57 along resistance 67 rebalances the bridge circuit 56, which takes place when the slider 57 has moved approximately half way between its limiting positions.

It will be readily understood that when the temperature adjacent the resistance element 65 drops, the system operates in a manner entirely analogous to that just described.

In the system shown in Figure 2, the stationary contacts which are engaged by movable contacts 23 and 24 are mounted on pressback blades, so that when the switch arm 21 moves to open either switch, it gets up speed and is moving rapidly at the time switch blade 93 engages stop 94, thereby preventing contact 92 from following contact 23 further. Contact 23 is then driven rapidly away from contact 92, thereby reducing the arcing at these two high load contacts.

While I have shown and described certain preferred embodiments of my invention, it will be readily understood by those skilled in the art that other modifications thereof may be made without departing from the spirit of the invention, and I therefore wish to be limited only by the appended claims.

I claim as my invention:

1. Control apparatus, comprising in combination, mechanism to be controlled, a normally balanced electrical network, means for unbalancing said network, first and second devices for rebalancing said network, means responsive to unbalance of said network for operating the first of said devices in a direction to rebalance said network, and means effective upon a predetermined operation of said first device for controlling said mechanism and causing operation of the second of said devices also in a direction to rebalance said network.

2. Control apparatus, comprising in combination, a normally balanced electrical network, means for unbalancing said network, a first device for rebalancing said network, means responsive to unbalance of said network including a pilot motor for operating said first device, first and second switch means sequentially closable by said pilot motor, said first switch means to close being effective upon a predetermined operation of said first device to introduce an additional unbalance effect in said network in the same sense as the unbalance effect which caused said predetermined operation, yieldable connections between said pilot motor and said first device, and between said pilot motor and said switch means, a load device to be driven, a main motor for driving said load device, a controller for said main motor including said second switch means, said pilot motor operating in response to said additional unbalance effect to close said second switch means rapidly and forcibly, and a second device for rebalancing said network operated by said main motor.

3. Control apparatus, comprising in combination, a normally balanced electrical network, means for unbalancing said network, a first device for rebalancing said network, means responsive to unbalance of said network including a pilot motor for operating said first device, first and second switch means sequentially closable by said pilot motor, said first switch means to close being effective upon a predetermined operation of said first device to introduce an additional unbalance effect in said network in the same sense as the unbalance effect which caused said predetermined operation, yieldable connections between said pilot motor and said first device, and between said pilot motor and said switch means, a load device to be driven, a main motor for driving said load device, a controller for said main motor including said second switch means, said pilot motor operating in response to said additional unbalance effect to close said second switch means rapidly and forcibly, and a second device for rebalancing said network operated by said main motor, said second switch means being effective upon closure thereof to continue operation of said main motor until said second device unbalances said network in a sense opposite to that of said first-mentioned unbalance, thereby causing reversal of said pilot motor and opening of said second switch means, said second switch means comprising a resilient blade biased to engage a stop, said stop and blade cooperating upon reversal of said pilot motor to cause sudden opening of said second switch means.

4. Control apparatus, comprising in combination, a normally balanced electrical network, means for unbalancing said network, a first device for rebalancing said network, means responsive to unbalance of said network including a pilot motor for operating said first device, two pairs of switches, each pair of switches being sequentially closable by said pilot motor upon operation thereof in one direction, the first of said switches to close being effective upon a predetermined operation of said first rebalancing device to introduce an additional unbalance effect in said network in the same sense as that which caused said predetermined operation, a slip-friction connection between said first switch to close and said pilot motor to permit continued operation of said motor while maintaining said switch closed, a load device to be driven, a main motor for driving said load device, a controller for said main motor including the second of said switches to close, and a second device for rebalancing said network operated by said main motor, said second switch being effective upon closure thereof to continue operation of said main motor until said second device unbalances said network in a sense opposite to that of said first-mentioned unbalance, thereby causing reversal of said pilot motor and opening of said second switch.

5. Control apparatus, comprising in combination, a normally balanced electrical network, means for unbalancing said network, a first device for rebalancing said network, means responsive to unbalance of said network including a pilot motor for operating said first device, two pairs of switches, each pair of switches being sequentially closable by said pilot motor upon operation thereof in one direction, the first of said switches to close being effective upon a predetermined operation of said first rebalancing device to introduce an additional unbalance effect in said network in the same sense as that which caused said predetermined operation, a slip-friction connection between said first switch to close and said pilot motor to permit continued operation of said motor while maintaining said switch closed, a load device to be driven, a main motor for driving said load device, a controller for said main motor including the second of said switches to close, said pilot motor being operated in response to said additional unbalance effect to close said second switch rapidly and forcibly, a slip-friction connection between said second switch and said pilot motor to permit continued operation of said motor while maintaining said switch closed, a second device for rebalancing said network operated by said main motor, said second switch being effective upon closure thereof to continue operation of said main motor until said second device unbalances said network in a sense opposite to that of said first-mentioned unbalance, thereby causing reversal of said pilot motor and opening of said second switch.

6. Control apparatus, comprising in combination mechanism to be controlled, a normally balanced electrical network, means for unbalancing said network, a pair of devices for rebalancing said network, means responsive to unbalance of said network for operating one of said devices in a manner to rebalance said network, and means effective upon a predetermined operation of said one device as a result of unbalance of said network for controlling said mechanism and causing operation of the other of said devices to also rebalance said network, said second device having a greater effect on the unbalance condition of said network than said first device.

7. Control apparatus, comprising in combination, a normally balanced electrical network, means for unbalancing said network, means for rebalancing said network, means responsive to unbalance of said network including a pilot motor for operating said rebalancing means, first and second switch means sequentially closable by said pilot motor, said first switch means to close being effective upon a predetermined operation of said rebalancing means to introduce an additional unbalance effect in said network in the same sense as the unbalance which caused said predetermined operation, thereby insuring quick and forcible closure of said second switch means by said pilot motor, a load device to be driven, a second rebalancing means for said network, a main motor for driving said load device and second rebalancing means, and a controller for said main motor including said second switch means.

8. Control apparatus, comprising in combination, a normally balanced electrical network, means for unbalancing said network, a first device for rebalancing said network, means responsive to unbalance of said network including a pilot motor for operating said first rebalancing device, first and second switch means sequentially closable by said pilot motor, said first switch means to close being effective upon a predetermined operation of said rebalancing means to introduce an additional unbalance effect in said network in the same sense as the unbalance which caused said predetermined operation, thereby insuring quick and forcible closure of said second switch means by said pilot motor, a load device to be driven, a main motor for driving said load device, a controller for said main motor including said second switch means, and a second device for rebalancing said network operated by said main motor, said second rebalancing device having a greater effect on the unbalance condition of said network than said first rebalancing device.

9. A control system, comprising in combination, a first control device having a normal position, a second control device operated upon movement of said first control device away from said normal position, means having an electrical characteristic variable in accordance with a condition indicative of the need for operation of at least one of said control devices, a normally balanced electrical network including said condition responsive means, said condition responsive means being operative upon a change in said condition to unbalance said network, means responsive to unbalance of said network for operating said first control device, first rebalancing means in said network operated by said first control device upon movement thereof away from said normal position, and second rebalancing means in said network operated by said second control device in the same sense as said first rebalancing means as to cause reversal of said unbalance responsive means and restoration of said first control device to substantially its normal position.

10. A control system, comprising in combination, an electrical network, a control impedance means operable to change an electrical characteristic of said network, a first control device having a normal position, means responsive to a change in said electrical characteristic of said network by said control impedance means for moving said first control device away from its normal position, a second impedance means in said network, means for varying said second impedance means so as to change said electrical characteristic in a sense opposite to the change produced by said control impedance means upon the resulting movement of said first control device, a second control device also operated upon such movement of said first control device away from its normal position, and third impedance means in said network operated by said second control device to produce another change in said electrical characteristic in the same sense as produced by said second impedance means and to such an extent as to cause a reversal in sense of said electrical characteristic whereby said first control device is returned toward its normal position by said means responsive to the change in said electrical characteristic.

11. A control system, comprising in combination, a normally balanced electrical network, a control impedance means operable to unbalance said network, a first control device having a normal position, means responsive to unbalance of said network in a first direction by said control impedance means for moving said first control device away from its normal position, a second impedance means in said network, means for varying said second impedance means so as to rebalance said network upon such movement of said first control device, a second control device also operated upon such movement of said first control device away from its normal position, and third impedance means in said network operated by said second control device to produce an unbalance in said network in an opposite direction whereby said first control device is returned toward its normal position by said unbalance responsive means.

12. Control apparatus comprising, a normally balanced electrical network, means for unbalancing said network initially, means responsive to the unbalance in said network, a control mechanism operated thereby upon initial unbalancing of said network to further unbalance said network, a second control mechanism operated by said unbalance responsive means in response to said further unbalance in the network, a main power means placed in operation by said second control means, and rebalancing means operated by said power means until said network is unbalanced in the opposite direction, said unbalance responsive means thereupon responding to such opposite unbalance to return said first and second control mechanisms toward their original positions to remove said further unbalance from said network and to stop operation of said main power means.

13. A control system, comprising, a normally balanced electrical network, a control impedance means operable to change an electrical characteristic of said network and thus unbalance said network in a first or second sense, means selectively responsive to unbalance of said network in either said first or second sense, positioning means selectively operated in a first or second direction by said unbalance responsive means upon selective unbalance of said network in said first or second sense, said positioning means remaining stationary in the position to which it has been moved upon restoration of balance in said network, a first control device positioned by said positioning means and moved upon unbalance of said network in said first sense by said control impedance means, a second impedance means in said network operated by said positioning means to change said electrical characteristic in said second sense when said first control device is thus positioned by said positioning means, a second control device also operated upon such movement of said first control device, and third impedance means in said network actuated by said operation of said second control device to produce another change in said electrical characteristic to unbalance said network in said second sense and to such an extent as to cause a reversal in the unbalance of said network whereupon said unbalance responsive means moves said first control device back towards its original position.

HUBERT T. SPARROW.